US007602984B2

(12) United States Patent
Thomas (10) Patent No.: US 7,602,984 B2
(45) Date of Patent: Oct. 13, 2009

(54) ADAPTIVE METHOD AND SYSTEM FOR ENCODING DIGITAL IMAGES FOR THE INTERNET

(75) Inventor: Kasman Ellis Thomas, Wilton, CT (US)

(73) Assignee: Novell, Inc., Provo, UT (US)

( * ) Notice: Subject to any disclaimer, the term of this patent is extended or adjusted under 35 U.S.C. 154(b) by 920 days.

(21) Appl. No.: 11/236,891

(22) Filed: Sep. 28, 2005

(65) Prior Publication Data
US 2007/0071337 A1 Mar. 29, 2007

(51) Int. Cl.
*G06K 9/46* (2006.01)
*G06K 9/00* (2006.01)

(52) U.S. Cl. ........................ 382/240; 382/253
(58) Field of Classification Search .............. 382/240, 382/253
See application file for complete search history.

(56) References Cited

U.S. PATENT DOCUMENTS

| 6,873,988 | B2 | 3/2005 | Hermann et al. | |
| 7,305,148 | B2 * | 12/2007 | Spampinato et al. | 382/299 |
| 2006/0022997 | A1 * | 2/2006 | Spampinato et al. | 345/606 |

FOREIGN PATENT DOCUMENTS

AU 746669 B2 5/2002

OTHER PUBLICATIONS

Rafael C. Gonzalez, Digital Image Processing, Prentice Hall, 2nd Edition, pp. 386-401.*

Battiato, et al. "SVG Rendering of Digital Images: an Overview," Image Processing Laboratory, Computer Science Department, University of Catania, Retrieved from http://svg.dmi.unict.it/iplab/USER/viewpublication.php?id_pub=23 on Aug. 9, 2005.
Battiato, et al. "Advanced SVGTriangulation/Polygonalization of Digital Images," Image Processing Laboratory, Computer Science Department, University of Catania, Retrieved from http://svg.dmi.unict.it/iplab/USER/viewpublication.php?id_pub=21 on Aug. 9, 2005.
Battiato, et al. "SVG Rendering for Internet Imaging," Image Processing Laboratory, Computer Science Department, University of Catania, Retrieved from http://svg.dmi.unict.it/iplab/USER/viewpublication.php?id_pub=3 on Aug. 9, 2005.

(Continued)

*Primary Examiner*—Vikkram Bali
*Assistant Examiner*—Max Shikhman
(74) *Attorney, Agent, or Firm*—Haynes Boone, LLP (57) ABSTRACT

A system and method comprise defining a current rectangular region of the image bitmap, quantifying spectral characteristics of the current rectangular region, dividing the current rectangular region into four rectangular sub-regions in response to the spectral characteristics being greater than a predetermined threshold value, tagging the current rectangular sub-region as a terminal rectangular region in response to the spectral characteristics being less than or equal to the predetermined threshold value, tagging each rectangular sub-region as a terminal rectangular region in response to a size of the rectangular sub-region being less than or equal to a predetermined threshold size, defining one of the non-terminal rectangular sub-regions as the current rectangular region and repeating the above until all rectangular regions are tagged terminal, and determining color characteristics for each of the terminal rectangular regions.

37 Claims, 4 Drawing Sheets

OTHER PUBLICATIONS

European Patent Office, Communication and Partial European Search Report from European Patent Application No. 06118966.8, dated Nov. 24, 2008, 6 pages.

Battiato, S. et al., "SVG Rendering of Real Images Using Data Dependent Triangulation", Proceedings of the 20th Spring Conference on Computer Graphics, SCCG 2004, Apr. 22, 2004, pp. 185-192.

Prasad, L. et al., "Raster to Vector Conversion of Images for Efficient SVG Representation", Proceedings of the 4th Annual Conference on Scalable Vector Graphics, Aug. 15, 2005, pp. 1-39.

* cited by examiner

ADAPTIVE METHOD AND SYSTEM FOR ENCODING DIGITAL IMAGES FOR THE INTERNET

BACKGROUND

A digital image is a representation of a two-dimensional picture or graphics as a finite set of digital values, called picture elements or pixels. Typically, the pixels are stored in computer memory as a raster image or raster map expressed in a two-dimensional array of integers. These values are often transmitted or stored in a compressed form. Digital images can be created by a variety of input devices and techniques, such as digital cameras, scanners, airborne radar, and more. They can also be synthesized from arbitrary non-image data, such as mathematical functions or three-dimensional geometric models in computer graphics, for example.

Common formats for digital image files include JPEG (Joint Photographic Experts Group), GIF (Graphics Interchange Format), and PNG (Portable Network Graphics). However, these digital image formats are not compatible with XML (extensible Markup Language), a text-based format that has increasingly become an important format for many World Wide Web or Internet technologies. These digital image files cannot be easily embedded within XML and require a cumbersome re-encoding process that changes the binary digital image data into a format such as Base 64 that is compatible with XML. These typical re-encoding processes greatly increase processing time as well as demanding larger network bandwidth during electronic transmission.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
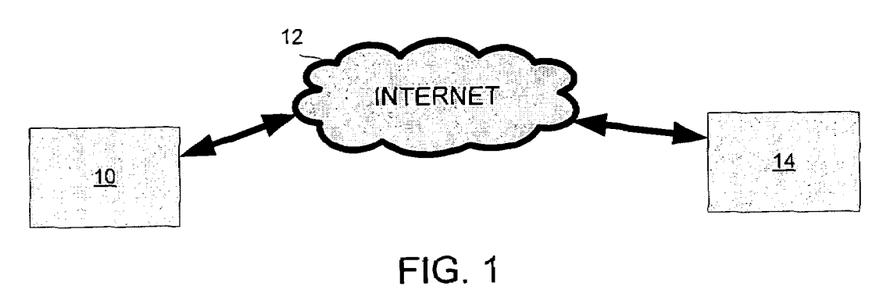
FIG. 1 is a greatly simplified block diagram of an embodiment of a system for encoding digital images for the Internet.

FIG. 1 is a greatly simplified block diagram of an embodiment of a system 10 encoding digital images for the Internet 12. System 10 may be any suitable computing device that has sufficient computing and memory storage resources to execute the method described herein. System 10 may comprise a personal computer, workstation, computer server, laptop computer, and portable or mobile computing devices now known or later developed. System 10 may be coupled or in communication with the Internet 12 for transmitting digital image files as well as other forms of data to and from another Internet-enabled device 14. Internet-enabled device 14 may be a computer, computer server, printer, facsimile machine, database, and/or any other suitable device that is operable to receive, process, store, and/or output the digital image file.

Figure 2:
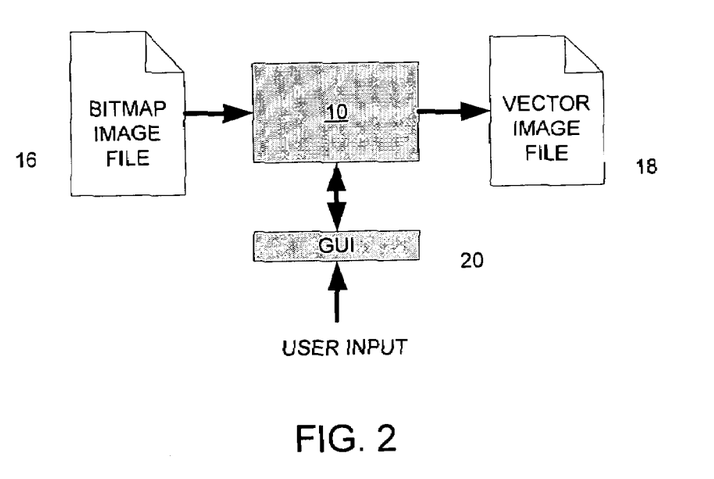
FIG. 2 is a simplified diagram of an embodiment of a method and system for encoding digital images for the Internet.

FIG. 2 is a simplified diagram of an embodiment of a method and system 10 for encoding digital images for the Internet. System 10 receives, as an input, a bitmap image file 16. Bitmap image file 16 may be in a format such as JPEG (Joint Photographic Experts Group), GIF (Graphics Interchange Format), and PNG (Portable Network Graphics). In bitmap image file 16, the image is modeled as a one-to-one mapping of color values onto equal-sized, equal-spaced picture elements or pixels. These pixels are typically arranged in a rectilinear mosaic or grid with a fixed number of rows and columns. Using the process described herein, system 10 is operable to transform bitmap image file 16 into a vector image file 18 having a format compatible with XML (extensible Markup Language), such as SVG (Scalable Vector Graphics). SVG is a vector imaging technology in which images are modeled as lines, polygons, ellipses, and other geometric primitives. SVG is a scalable format in terms of resolution, color spaces, and available bandwidth, and is especially suitable to mobile and limited-resource applications such as personal digital assistant (PDA) devices and mobile phones. System 10 may also receive, via a graphical user interface (GUI) 20 for example, user input of parameters that may be used to tune or adjust the digital file encoding process. Details of the encoding process are provided below.

Figure 3:
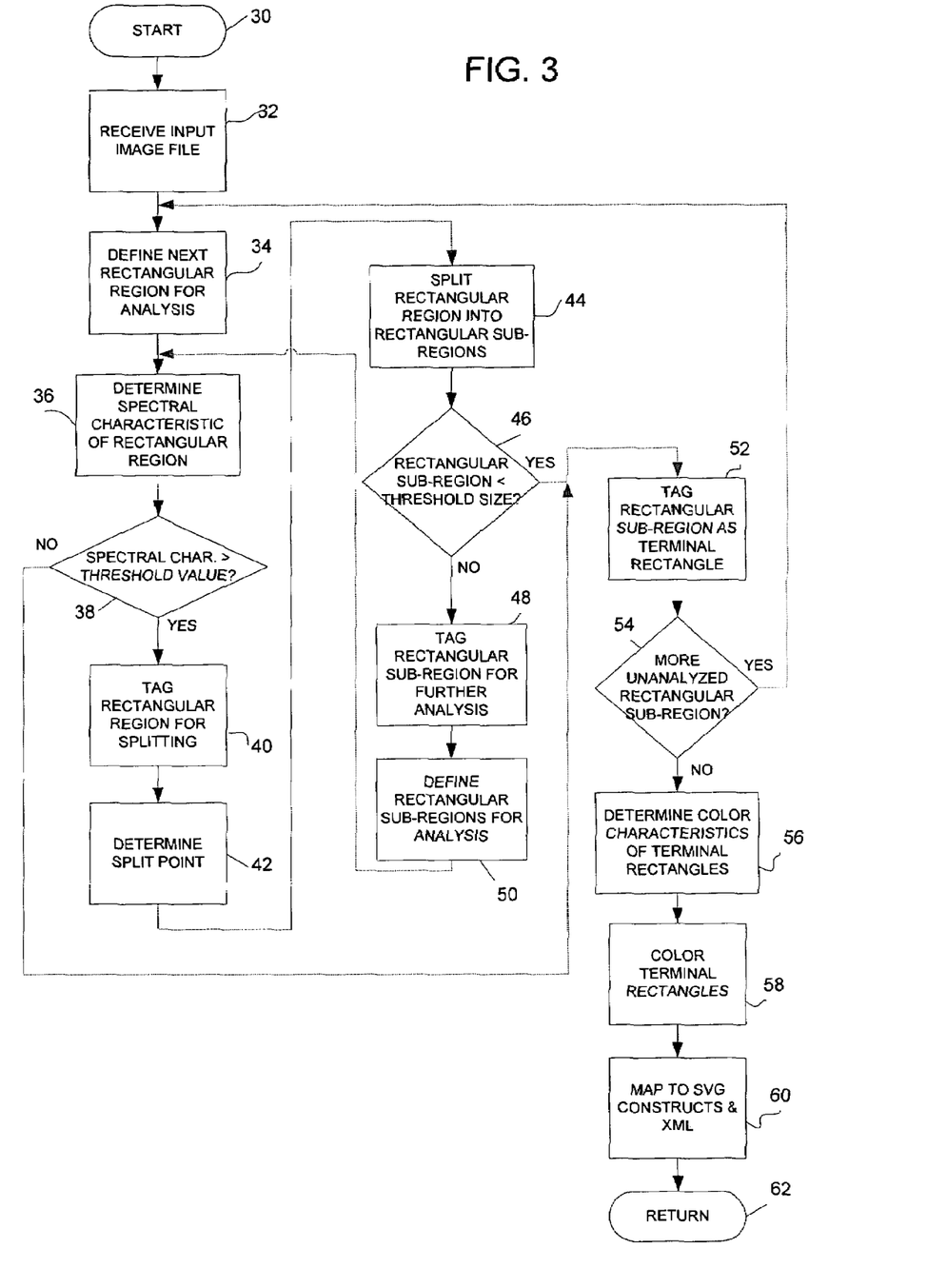
FIG. 3 is a simplified flowchart of an embodiment of a method for encoding digital images for the Internet.

FIG. 3 is a simplified flowchart of an embodiment of a method 30 for encoding digital images for the Internet. In step 32, an input image file 16 (FIG. 2) is received. Image file 16 is a bitmap file that includes a two-dimensional pixel array as described above. In step 34, a rectangular region for analysis is defined. In the initial pass, the rectangular region is defined as the entire image represented in the image file, such as image 120 in FIG. 7. In subsequent recursive passes, the rectangular region for analysis will become increasingly smaller rectangular areas generated by sub-dividing the initial rectangular region. In step 36, the spectral characteristics of the rectangular region is determined. The spectral characteristics of the rectangular region quantify the frequency spectrum or amount of details or variations that are presents in the rectangular region. Areas of fine detail should be further subdivided for analysis, but areas with very little variation in pixel values need not be further divided into smaller rectangular regions. Details of the process to determine spectral characteristics is described below with reference to FIG. 4. In step 38, the spectral characteristics value is compared with a threshold value. If the spectral characteristics value is greater than the threshold value, then the rectangular region contains many more details and should be further divided into rectangular sub-regions for analysis. Therefore, the rectangular region is tagged or otherwise flagged for splitting or subdividing in step 40.

Figure 7:
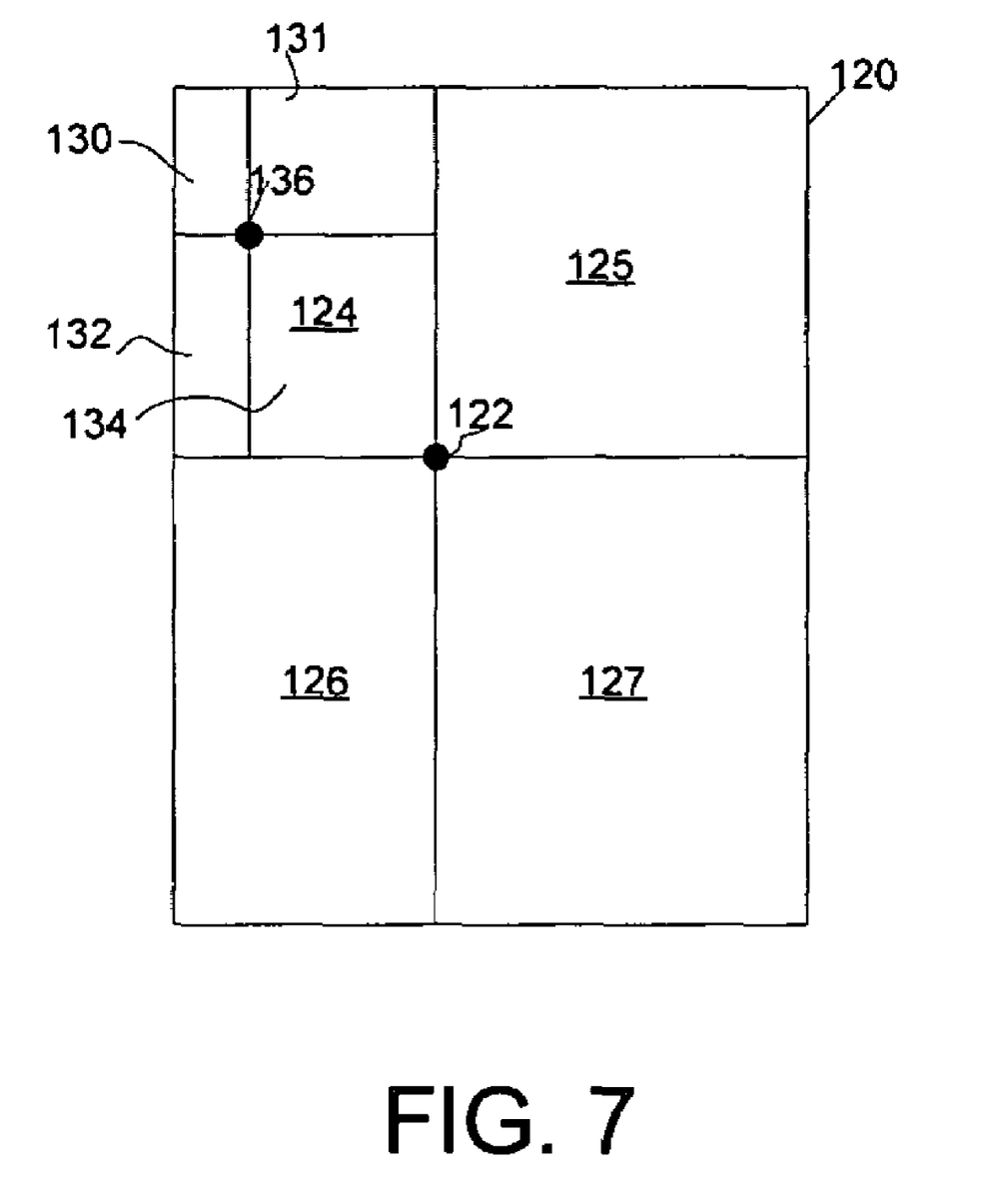
FIG. 7 is a simplified diagram of a rectangular region with numerous rectangular sub-regions of various sizes.

In step 42, a split point representing the point common to all four of the sub-divided rectangular regions is determined such as split point 122 in FIG. 7 for dividing the image. The split point is chosen to minimize information loss in the final rendered vector image as compared with the original bitmap image. The exact location of the split point may be determined via some heuristic algorithm. Details of this process is described below with reference to FIG. 5. In step 44, the current rectangular region is divided into rectangular sub-regions substantially horizontally and vertically from the split point to the boundaries of the rectangular region. In the example shown in FIG. 7, the initial rectangular region has been divided into four rectangular sub-regions 124-127. The divided rectangular sub-regions are likely to have different sizes and aspect ratios. In step 46, each of the rectangular sub-regions are compared with a threshold size. If the size of a rectangular sub-region is smaller than the threshold size, then the rectangular sub-region has reached a size that cannot be further divided. If the size of the resultant rectangular region is greater than or equal to the threshold size, then in step 48 that region is tagged or otherwise flagged for further analysis. In step 50, the tagged rectangular regions are defined for further analysis as execution proceeds to step 36. The process proceeds recursively and analyzes each area of the image until all rectangular regions of the image are tagged as "terminal" and thus do not require further subdivision and analysis. In the example shown in FIG. 7, rectangular sub-region 124 is divided into regions 130-134 by selecting split point 136. This process continues until all rectangular regions are flagged as "terminal."

If in step 46 the rectangular sub-region size is smaller than the threshold size, then the rectangular sub-region is tagged or flagged as a "terminal" rectangle in step 52. A terminal rectangle is not further divided into sub-regions. In addition to a size threshold comparison, a rectangular region can also become a terminal rectangle if its spectral characteristics are determined to not exceed a threshold value in step 38. In this case, the rectangular region does not contain sufficient details or variations that requires further sub-division and analysis. The process proceeds recursively until all areas of the image are tagged as "terminal" rectangles that require no further subdivision and analysis.

In step 54, a determination is made as to whether there are any more non-terminal rectangular regions for analysis. If there are, the next rectangular region is defined for analysis in step 34. If there are no more non-terminal rectangular regions for analysis, then the color characteristics of the terminal rectangles are determined in step 56. Details of this coloring process is described below with reference to FIG. 6. In step 58, the terminal rectangles are "colored" accordingly. In step 60, the dimensional and color-fill characteristics of all terminal rectangles are mapped to corresponding SVG constructs, and then the SVG constructs are made transmissible on physical media in the form of XML. The process ends in step 62.

It should be noted that all of the steps in method 30 may be performed server-side and the results communicated to a client computer. Alternatively, some of the steps may be performed server-side and the remaining steps carried out client-side so that the SVG construct materializes on the client system. The client-side operations may be performed by an applet, in client application's executable logic, or in a Java script or other interpreter under the control of the client application. The tuning parameters and image data may be communicated from a client to the server and the final image file based in XML communicated to the client. The client computer may perform the rendering function where the server transmits the rectangular region data in sorted order, such as from largest to smallest in size, or from one corner to the opposing corner, to the client.

Figures 4, 5:
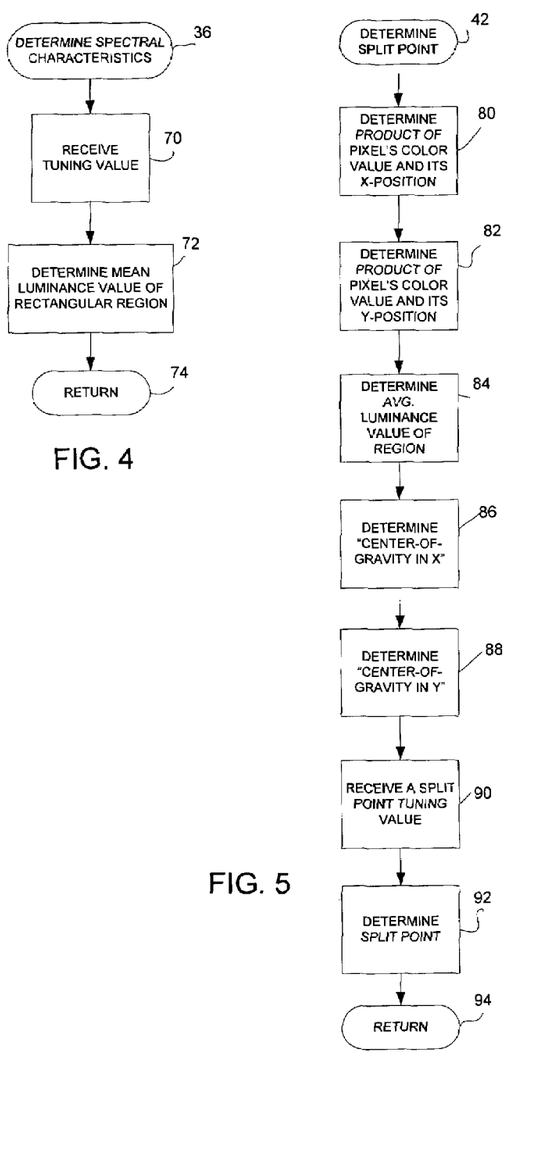
FIG. 4 is a simplified flowchart of an embodiment of a method for determining spectral characteristics in a rectangular region under analysis.
FIG. 5 is a simplified flowchart of an embodiment of a method for determining a split point for further sub-dividing a rectangular region.

FIG. 4 is a simplified flowchart of an embodiment of a method 36 for determining the spectral characteristics in a rectangular region under analysis. In step 70, an optional tuning value is received. The gain or tuning parameter may be used to adjust the spectral frequency calculation to take into account of the size of the rectangular region, the recursive level, and/or other factors. The gain value setting may be received from a user or from determinations made by algorithms in method 30, for example. In step 72, a root-mean-square error metric is calculated based on the pixel variances to determine a mean luminance value which quantifies the spectral frequency or characteristics of the rectangular region. The process returns in step 74. It should be noted that this example is but one way to determine the spectral frequency or entropy of the region.

FIG. 5 is a simplified flowchart of an embodiment of a method 42 for determining a split point for further sub-dividing a rectangular region. The method looks at each pixel in the rectangular region and heuristically determines a "center of gravity" of the rectangular region. In step 80, the method determines the product of the current pixel's color value and its relative x-position in the rectangular region normalized on the unit interval. This yields the pixel's moment in x or its x-moment. In step 82, the same is calculated in the y-axis to multiply the same pixel's color value with the pixel's relative y-position in the rectangular region. This yields the y-moment. Steps 80 and 82 are performed recursively until all pixels in the current rectangular region is processed. In step 84, the average luminance value of the rectangular region is determined by determining the luminance value of each pixel and divided by the number of pixels. In step 86, the center-of-gravity of the rectangular region in x is determined by calculating the sum of all the x-moments and divide it by the average luminance value. In step 88, the same is performed for the y-axis by summing all the y-moments and dividing the sum by the average luminance value. The center-of-gravity in x and the center-of-gravity in y so computed are the x and y-coordinates of the center-of-gravity of the given rectangular region. In step 90, an optional split point tuning parameter is received from a user or some other function of method 30. The gain may be correlated to the size of the rectangular region and/or recursive depth and/or some other factors so that the returned value is dependent on the recursive level of the current rectangular region. In step 92, the split point is determined by using a modulatable function that relies on the center-of-gravity value and the received tuning value. For example, the split point in the x-axis may be given by:

$$\text{split point in } x = a + \text{gain} * (b-a),$$

where "a" is the geometric center of the rectangular region and "b" is the center-of-gravity in the x-axis. The resultant split point is the point common to all four child rectangular sub-regions divided from the current rectangular region. The resultant rectangular sub-regions are analyzed unless the spectral frequency or the size of the sub-region is below predetermined respective threshold values.

Figure 6:
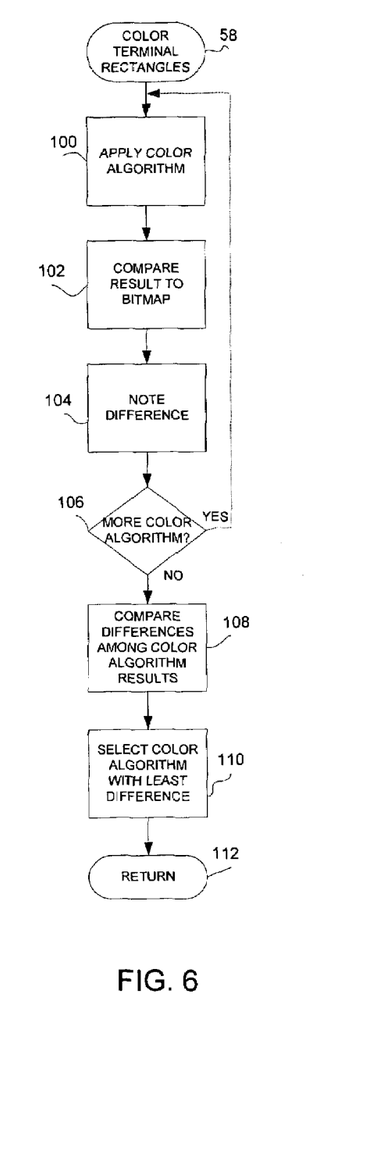
FIG. 6 is a simplified flowchart of an embodiment of a method for coloring terminal rectangles.

FIG. 6 is a simplified flowchart of an embodiment of a method 58 for coloring the terminal rectangles. This method determines, heuristically, how to color-fill the rectangular region at rasterization time. In step 100, a first color algorithm is applied. A color algorithm determines a way to apply one or more color values to the rectangular region. For example, one color algorithm may apply one color uniformly in the rectangular region. Another color algorithm may select two anchor points and apply two colors respectively across the rectangular region using interpolation techniques to apply the colors in a linear or nonlinear gradient. The anchor points may be located at opposing corners of the rectangular region, for example. In steps 102 and 104, the color-filled result is compared with the original bitmap and their differences noted. In step 106, if there are more color algorithms to try, then it is applied until all color algorithms have been attempted and their respective comparisons with the original bitmap noted. In steps 108 and 110, the comparison differences of the color algorithms are compared to determine one color algorithm that yields the least difference. In this manner, "information loss" in the transformation process is minimized. The result is then returned in step 112. A pointer pointing to the selected color algorithm may be returned in this manner so that the algorithm may be applied at image rendering time. It may be seen that different color algorithms or fill heuristics are likely to be applied to different rectangular regions of an image. The color-fill algorithm may involve SVG gradients and opacity and transparency values as defined in SVG specifications.

It may be seen that all the final geometric and color data are expressed in XML that conforms to the SVG specifications set by the World Wide Web Consortium (W3C). This enables image files to be easily embedded in XML for transmission via the Web, and transformed, stored, manipulated and rendered in a SVG-capable environment. Unlike other bitmap-to-vector conversion methods, this method is not computationally intensive. The geometric primitives created by this method, namely rectangles, may be rendered with speed. The size of the resulting SVG file may be controlled using the tuning variables. This system and method provide a fast, lossy transcoding of bitmap image data to a vector format described in a well-known XML grammar, and provides a scale-sensitive method that gives the user the ability to fine-tune parameters with respect to the retention of image fidelity. The resultant rectangular sub-regions are tagged or provided with vector-rendering "hints" or information to reconstruct the image in a fidelity-optimized manner.

It should be noted that some steps of the method described above may be performed server-side while others may be performed client-side. For example, all the steps of the method up to step 58 may be performed server-side, and then the SVG construct materializes on the client. Further, tuning parameters may be received at the client side and then transmitted to the server where the conversion takes place. Progressive rendering may also take place on the client where the server transmits rectangular region data in some sorted order (such as from largest to smallest rectangular regions, or according to their positions in the image) to the client for rendering.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method comprising using a processor to perform the steps of: receiving an image bitmap; defining the image bitmap as a current rectangular region; quantifying spectral characteristics of the current rectangular region; comparing the spectral characteristics to a predetermined threshold value; dividing the current rectangular region into four rectangular sub-regions in response to the spectral characteristics being greater than the predetermined threshold value; tagging the current rectangular sub-region as a terminal rectangular region in response to the spectral characteristics being less than or equal to the predetermined threshold value; comparing respective sizes of each of the four rectangular sub-regions to a predetermined threshold size; tagging each rectangular sub-region for further subdivision in response to the size of the rectangular sub-region being greater than the predetermined threshold size; tagging each rectangular sub-region as a terminal rectangular region in response to the size of the rectangular sub-region being less than or equal to the predetermined threshold size; defining one of the rectangular sub-regions as the current rectangular region and repeating the above until all rectangular regions are tagged terminal; determining color characteristics for each of the terminal rectangular regions; mapping the dimensional and coloring characteristics to a vector construct; and converting the vector construct to a text-based Internet format.

2. The method of claim 1, further comprising determining a split point common to all four rectangular sub-regions for subdividing the current rectangular region.

3. The method of claim 2, wherein determining a split point comprises determining a center-of-gravity of the rectangular region based on color values of pixels in the rectangular region and an average luminance value of the rectangular region.

4. The method of claim 2, wherein determining a split point comprises:
   determining a moment in x for each pixel in the rectangular region;
   determining a moment in y for each pixel in the rectangular region;
   determining an average luminance value for the rectangular region;
   determining a center-of-gravity in x using the moment in x of the pixels in the rectangular region and average luminance value;
   determining a center-of-gravity in y using the moment in x of the pixels in the rectangular region and average luminance value; and
   determining a split point in response to the center-of-gravity in x and center-of-gravity in y.

5. The method of claim 4, wherein determining a split point comprises tuning the split point determination using a tuning value based on a number of recursive iterations in sub-dividing the rectangular region.

6. The method of claim 4, wherein determining a split point comprises tuning the split point determination using a tuning value based on size of the rectangular region being subdivided.

7. The method of claim 1, wherein determining color characteristics for each of the terminal rectangular regions comprises:
   selecting a color fill algorithm;
   comparing result of the selected color fill algorithm to image bitmap and quantify a difference thereof;
   selecting additional color fill algorithms and comparing results to image bitmap and quantify differences thereof; and
   selecting one color fill algorithm having the least difference.

8. The method of claim 1, wherein quantifying spectral characteristics of the current rectangular region comprises:
   receiving a gain relating to a size of the rectangular region; and
   determining a mean luminance value of the rectangular region in response to the gain.

9. The method of claim 1, wherein quantifying spectral characteristics of the current rectangular region comprises:
   receiving a gain relating to a number of recursive iterations in sub-dividing the rectangular region; and
   determining a mean luminance value of the rectangular region in response to the gain.

10. The method of claim 1, wherein mapping the dimensional and coloring characteristics to a vector construct comprises mapping to a Scalable Vector Graphics construct.

11. The method of claim 1, wherein converting the vector construct to a text-based Internet format comprises converting the vector construct to XML.

12. A method of converting an image bitmap comprising using a processor to perform the steps of: defining a current rectangular region of the image bitmap; quantifying spectral characteristics of the current rectangular region; dividing the current rectangular region into four rectangular sub-regions in response to the spectral characteristics being greater than a predetermined threshold value; tagging the current rectangular sub-region as a terminal rectangular region in response to the spectral characteristics being less than or equal to the predetermined threshold value; tagging each rectangular sub-region as a terminal rectangular region in response to the size of the rectangular sub-region being less than or equal to a predetermined threshold size; defining one of the non-terminal rectangular sub-regions as the current rectangular region and repeating the above until all rectangular regions are tagged terminal; and determining color characteristics for each of the terminal rectangular regions.

13. The method of claim 12, further comprising:
mapping the dimensional and coloring characteristics to a vector construct; and
converting the vector construct to a text-based Internet format.

14. The method of claim 12, further comprising determining a split point common to all four rectangular sub-regions for subdividing the current rectangular region.

15. The method of claim 14, wherein determining a split point comprises determining a center-of-gravity of the rectangular region based on color values of pixels in the rectangular region and an average luminance value of the rectangular region.

16. The method of claim 14, wherein determining a split point comprises:
determining a moment in x for each pixel in the rectangular region;
determining a moment in y for each pixel in the rectangular region;
determining an average luminance value for the rectangular region;
determining a center-of-gravity in x using the moment in x of the pixels in the rectangular region and average luminance value;
determining a center-of-gravity in y using the moment in x of the pixels in the rectangular region and average luminance value; and
determining a split point in response to the center-of-gravity in x and center-of-gravity in y.

17. The method of claim 16, wherein determining a split point comprises tuning the split point determination using a tuning value based on a number of recursive iterations in sub-dividing the rectangular region.

18. The method of claim 16, wherein determining a split point comprises tuning the split point determination using a tuning value based on size of the rectangular region being subdivided.

19. The method of claim 12, wherein determining color characteristics for each of the terminal rectangular regions comprises:
selecting a color fill algorithm;
comparing result of the selected color fill algorithm to image bitmap and quantify a difference thereof;
selecting additional color fill algorithms and comparing results to image bitmap and quantify differences thereof; and
selecting one color fill algorithm having the least difference.

20. The method of claim 12, wherein quantifying spectral characteristics of the current rectangular region comprises:
receiving a gain relating to a size of the rectangular region; and
determining a mean luminance value of the rectangular region in response to the gain.

21. The method of claim 12, wherein quantifying spectral characteristics of the current rectangular region comprises:
receiving a gain relating to a number of recursive iterations in sub-dividing the rectangular region; and
determining a mean luminance value of the rectangular region in response to the gain.

22. The method of claim 13, wherein mapping the dimensional and coloring characteristics to a vector construct comprises mapping to a Scalable Vector Graphics construct.

23. The method of claim 13, wherein converting the vector construct to a text-based Internet format comprises converting the vector construct to XML.

24. A system comprising: a graphical user interface operable to receive user input; a CPU; a memory storing computer-readable code executable by said CPU, operable to perform:
defining a current rectangular region of the image bitmap;
quantifying spectral characteristics of the current rectangular region;
dividing the current rectangular region into four rectangular sub-regions in response to the spectral characteristics being greater than a predetermined threshold value;
"tagging" the current rectangular sub-region as a terminal rectangular region in response to the spectral characteristics being less than or equal to the predetermined threshold value;
tagging each rectangular sub-region as a terminal rectangular region in response to a size of the rectangular sub-region being less than or equal to a predetermined threshold size;
defining one of the non-terminal rectangular sub-regions as the current rectangular region and repeating the above until all rectangular regions are tagged terminal; and
determining color characteristics for each of the terminal rectangular regions.

25. The system of claim 24, wherein the computer-readable code further performs:
mapping the dimensional and coloring characteristics to a vector construct; and
converting the vector construct to a text-based Internet format.

26. The system of claim 24, wherein the computer-readable code further performs determining a split point common to all four rectangular sub-regions for subdividing the current rectangular region.

27. The system of claim 26, wherein determining a split point comprises determining a center-of-gravity of the rectangular region based on color values of pixels in the rectangular region and an average luminance value of the rectangular region.

28. The system of claim 26, wherein determining a split point comprises:
determining a moment in x for each pixel in the rectangular region;
determining a moment in y for each pixel in the rectangular region;

determining an average luminance value for the rectangular region;

determining a center-of-gravity in x using the moment in x of the pixels in the rectangular region and average luminance value;

determining a center-of-gravity in y using the moment in x of the pixels in the rectangular region and average luminance value; and determining a split point in response to the center-of-gravity in x and center-of-gravity in y.

29. The system of claim 28, wherein determining a split point comprises tuning the split point determination using a tuning value based on a number of recursive iterations in sub-dividing the rectangular region.

30. The system of claim 28, wherein determining a split point comprises tuning the split point determination using a tuning value based on size of the rectangular region being subdivided.

31. The system of claim 24, wherein determining color characteristics for each of the terminal rectangular regions comprises:

selecting a color fill algorithm;

comparing result of the selected color fill algorithm to image bitmap and quantify a difference thereof;

selecting additional color fill algorithms and comparing results to image bitmap and quantify differences thereof; and selecting one color fill algorithm having the least difference.

32. The system of claim 24, wherein quantifying spectral characteristics of the current rectangular region comprises:

receiving a gain relating to a size of the rectangular region; and determining a mean luminance value of the rectangular region in response to the gain.

33. The system of claim 24, wherein quantifying spectral characteristics of the current rectangular region comprises:

receiving a gain relating to a number of recursive iterations in sub-dividing the rectangular region; and determining a mean luminance value of the rectangular region in response to the gain.

34. The system of claim 25, wherein mapping the dimensional and coloring characteristics to a vector construct comprises mapping to a Scalable Vector Graphics construct.

35. The system of claim 25, wherein converting the vector construct to a text-based Internet format comprises converting the vector construct to XML.

36. A system comprising:

means for defining a current rectangular region of the image bitmap;

means for quantifying spectral characteristics of the current rectangular region;

means for dividing the current rectangular region into four rectangular sub-regions in response to the spectral characteristics being greater than a predetermined threshold value;

means for tagging the current rectangular sub-region as a terminal rectangular region in response to the spectral characteristics being less than or equal to the predetermined threshold value;

means for tagging each rectangular sub-region as a terminal rectangular region in response to a size of the rectangular sub-region being less than or equal to a predetermined threshold size;

means for defining one of the non-terminal rectangular sub-regions as the current rectangular region and repeating the above until all rectangular regions are tagged terminal; and means for determining color characteristics for each of the terminal rectangular regions.

37. The system of claim 36, further comprising:

means for mapping the dimensional and coloring characteristics to a vector construct; and means for converting the vector construct to a text-based Internet format.

* * * * *